Dec. 22, 1964    J. J. VAN DALEN ETAL    3,162,780
PIEZO-ELECTRICAL QUARTZ CRYSTAL IN EVACUATED GLASS HOUSINGS
Filed March 19, 1962
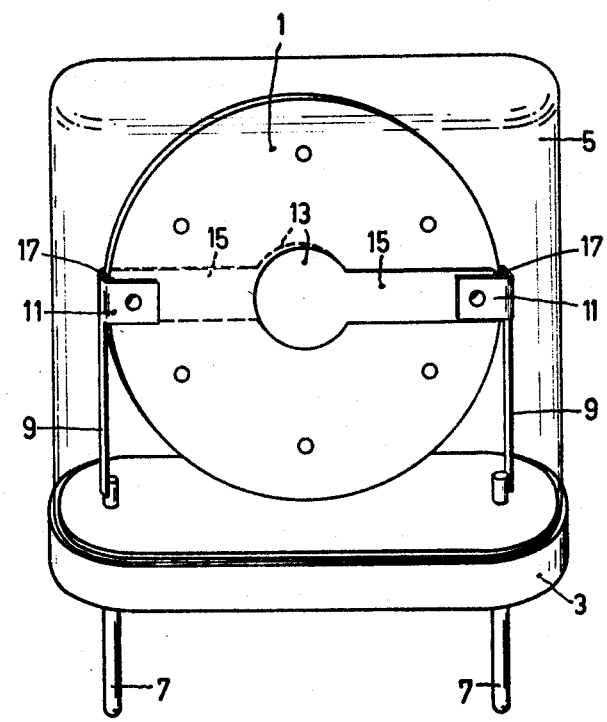
INVENTOR
JOHANNES J. VAN DALEN
BY JAN KUNNEN
AGENT

3,162,780
PIEZO-ELECTRICAL QUARTZ CRYSTAL IN EVACUATED GLASS HOUSINGS
Johannes Josephus van Dalen and Jan Kunnen, both of Emmasingel, Eindhoven, Netherlands, assignors to North American Philips Company, Inc., New York, N.Y., a corporation of Delaware
Filed Mar. 19, 1962, Ser. No. 180,630
Claims priority, application Germany Apr. 10, 1961
3 Claims. (Cl. 310—8.9)

The invention relates to a piezo-electrical quartz crystal in an evacuated housing formed by a base with insulated pins taken through it and a glass hood sealed to the base, the supply conductors being secured by means of a conductive cement.

Over the structure with supply wires directly sealed in the neck of the glass bulb the structure according to the invention has the advantage of a smaller size and of having the supply conductors connected inside the housing to short, rugged pins, which serve as plug pins, so that the shortest possible connections can be established. The connection between the supply conductors, which serve, in addition, as supports, and the electrodes applied to the crystal by spraying or evaporation is usually established by means of a conductive kind of cement consisting of a metal powder with an organic binder, usually a synthetic substance. The hood may be sealed by high-frequency heating so rapidly that substantially no decomposition of the cement occurs. It is found however, that after the glass hood has been sealed, mechanical stress prevails herein, so that the hood is likely to crack.

In accordance with the invention this disadvantage is overcome by connecting the supply conductors by means of a conductive cement consisting of water-glass and a metal powder and by annealing the glass housing to eliminate stress. Owing to the use of the known waterglass-containing cement it is possible, as will be explained more fully hereinafter to anneal the complete crystal with the housing to eliminate stress. Since this process must be continued for a fairly long time, for example for half an hour, the whole crystal assumes the temperature of about 500° C. required for obviating the stress in the glass, which would not be admissible, were an organic cement used. A cement on a glass or enamel base, though capable of resisting the said temperature, would also be unserviceable, since its adhesion to the crystal requires temperatures producing undesired modifications of the material structure of the quartz crystal. When water-glass cement is used, these difficulties are avoided.

The invention will now be described more fully with reference to the drawing, which shows one embodiment of the invention in a perspective view.

The device shown comprises an AT quartz crystal 1 for a frequency of, for example, 10 mc./s., arranged in an evacuated housing consisting of a glass or ceramic base or foot 3 with a glass hood 5, sealed to the foot. The hood may be sealed in known manner in a high-frequency field after a ring of conductive enamel between the foot 3 and the edge of the hood 5 to be sealed hereto has previously been applied. The foot has two, for example ferro-chromium, pins 7 sealed in it in an airtight manner; the pin parts protruding from the housing serve as connecting or contact pins. To the ends located inside the housing are welded strip-shaped metal supply conductors 9. At the free ends of each supply conductor 9 lateral tags 11 are formed, which are bent over at right angles towards each other and which hold clamped in between them the edge of the crystal plate 1. The quartz plate is thus connected to supply conductors 9 at two diametrically opposite places. The electrodes 13, which may be applied by evaporation (only one is shown in the figure) have each a radial off-shoot 15, which extends as far as underneath one of the tags 11 and which is in contact herewith. In order to establish a reliable electrical contact and a definite fastening of the plate 1 to the conductors 9, a conductive cement mass 17 is provided between each pair of associated tags 11, which mass also covers part of the off-shoot 15 concerned.

The cement consists of a solution of water-glass with 2–5% water and with 25–90% by weight of a metal powder suspended therein, for example sodium silicate with 4% water and 48% of silver powder formed preferably by very small flakes. This conductive cement is applied in the form of a paste between the tags 11 at the ends of the supply conductors 9. After drying at room temperature and at about 200° C., both for about 30 minutes the crystal with the cement mass 17 is heated in high vacuum of less than 0.1 micron at 500° C. for about 20 minutes until the cement no longer evolves gases/or water vapour; subsequently the glass hood 5 is sealed in high vacuum. The annealing of the hood to obviate stress which requires a temperature of about 500° C., can then be carried out without any difficulty, since the cement will not be weakened and will not emit gases or vapours likely to deteriorate the high vacuum in the housing or to produce a conductive deposit on the crystal.

Due to the annealing of the housing to obviate stress it is found that cracking of the hood is no longer produced.

What is claimed is:
1. A piezo-electric quartz crystal in an evacuated housing including a base provided with insulated contact pins, a glass hood sealed to said base, said housing being annealed to prevent cracking of said glass hood comprising; a plurality of supply conductors, each welded by one end to one of the contact pins, the free end of each conductor being provided with holding means for holding said crystal in place, and a conductive cement being provided between said holding means and said crystal for mechanical securing and electrical connecting said crystal to said supply conductors, said conductive cement being constituted of water glass with 2–5% by weight of water and 25–90% by weight of metal powder.

2. A piezo-electric quartz crystal in an evacuated housing as claimed in claim 1 wherein each of said holding means engage opposite sides of said crystal.

3. A method of cementing conductors to a quartz crystal with a cement constituted of a water glass with a metal powder suspended therein comprising applying the cement to said conductors, drying said assembly in air at room temperature for approximately 30 minutes, further drying said assembly in an oven having a temperature of approximately 200° C. for about 30 minutes, and degassing said crystal in a high vacuum oven at approximately 500° C. for about 20 minutes with a pressure less than .1 micron.

References Cited in the file of this patent
UNITED STATES PATENTS 2,392,429   Sykes _____ Jan. 8, 1946
2,785,321   Imler _____ Mar. 12, 1957